United States Patent [19]
Shelton

[11] Patent Number: 6,041,111
[45] Date of Patent: Mar. 21, 2000

[54] REMOTE TELEPHONE DATA ACCESS AND DISPLAY

[75] Inventor: Brian R. Shelton, Kanata, Canada

[73] Assignee: Nortel Networks Corporation, Montreal, Canada

[21] Appl. No.: 08/980,762

[22] Filed: Dec. 1, 1997

[51] Int. Cl.[7] .................................................. H04M 3/42

[52] U.S. Cl. .................. 379/201; 379/93.17; 379/93.25; 379/102.02; 379/229

[58] Field of Search ..................... 379/201, 219, 379/220, 207, 93.24, 100.01, 100.02, 93.25, 229, 230, 93.17, 102.02, 102.01; 370/352, 351

[56] References Cited

U.S. PATENT DOCUMENTS

| | | | |
|---|---|---|---|
| 4,253,157 | 2/1981 | Kirschner et al. | 379/93.25 |
| 5,008,930 | 4/1991 | Gawrys et al. | 379/210 |
| 5,235,680 | 8/1993 | Bijnagte | 379/93.25 |
| 5,555,299 | 9/1996 | Maloney et al. | 379/201 |
| 5,684,870 | 11/1997 | Maloney et al. | 379/201 |
| 5,737,395 | 4/1998 | Irribarren | 379/100.01 |
| 5,764,757 | 6/1998 | Christinger | 379/102.02 |
| 5,809,127 | 9/1998 | Ostrcil | 379/102.02 |
| 5,870,548 | 2/1999 | Nielsen | 379/93.24 |
| 5,898,772 | 4/1999 | Connors et al. | 379/201 |
| 5,903,640 | 5/1999 | Williams | 379/230 |

OTHER PUBLICATIONS

Advanced Telephone Terminals Design: Driving the Development of Next–Generation Terminals, Northern Telecom Limited. Reprinted from Telesis issue 103, Jul., 1997.

*Primary Examiner*—Scott Wolinsky

[57] ABSTRACT

A method and apparatus for accessing data stored in a local telephone terminal from a remote terminal and displaying or storing it on the remote terminal. An ADSI or JAVA script or readable message is sent to the local telephone terminal, providing it with instructions about how to transmit and translate the data for use by the remote terminal. The method allows for password protection of the date and non-ringing of the local telephone terminal.

16 Claims, 1 Drawing Sheet

REMOTE TELEPHONE DATA ACCESS AND DISPLAY

FIELD OF INVENTION

This invention is concerned with remote telephone data access and display, and in particular a method and apparatus by which a calling party can access data stored in the called party's local terminal and then display the data on the calling party's remote terminal.

BACKGROUND OF THE INVENTION

Display technologies have more recently assumed a more important role in telephony as telephone terminals are called upon to deliver an increasing range of call-management, messaging, and directory services. These services require interaction between the telephone user and the telephone network. Display screens on the telephone terminal provide telephone users with information about a call, guide them through the operation of services, and simplify network complexity for ease of use by a telephone user.

Displays are also important in accessing data that may be stored locally at a telephone terminal. Such information could include name-and-number directories; name-and-number of incoming call directories; and voice-mail message directories.

Current telephone systems do not provide the ability for accessing locally stored data from a remote telephone terminal and displaying it at the remote telephone terminal.

SUMMARY OF THE INVENTION

An object of the present invention is to provide a method and apparatus by which data stored at a local telephone terminal can be accessed and displayed by a remote telephone terminal.

In one aspect there is provided a method for displaying on a remote telephone terminal information stored at a local telephone terminal comprising the steps of: (a) generating a request for information at a remote telephone terminal; (b) transmitting said request to a network element; (c) transmitting a script from said network element to a local telephone terminal in response to said request; (d) transmitting information from said local telephone terminal to said remote telephone terminal in response to said script; and (e) displaying said information at said remote telephone terminal.

In another aspect there is provided a method for displaying on a remote telephone terminal information stored at a local telephone terminal comprising the steps: (a) generating a request for information to be displayed at a remote telephone terminal, said request including a script; (b) transmitting said request to a local telephone terminal; (c) transmitting information from said local telephone terminal to said remote telephone terminal in response to said script; and (d) displaying said information at said remote telephone terminal.

In another aspect there is provided a network element adapted to receive queries for information from a remote telephone terminal comprising: (a) a receiver for receiving a query from said remote telephone terminal at said network element; (b) a script generator for composing a request for information from a local memory of a local telephone terminal based on said guery; and, (c) a transmitter, for transmitting said request to said a local telephone terminal, said request causing selected content of said local memory to be transmitted from said local telephone terminal for said remote telephone terminal.

In another aspect there is provided a communications system for displaying on a remote telephone terminal information stored at a local telephone terminal comprising: (a) means for generating a request for information at a remote telephone terminal; (b) means for transmitting said request to a network element; (c) means for transmitting a script from said network element to a local telephone terminal in response to said request; (d) means for transmitting information from said local telephone terminal to said remote telephone terminal in response to said script; and (e) means for displaying said information at said remote telephone terminal.

In another aspect there is provided a communications system for displaying on a remote telephone terminal information stored at a local telephone terminal comprising: (a) means for generating a request for information to be displayed at a remote telephone terminal, said request including a script; (b) means for transmitting said request to a local telephone terminal; (c) means for transmitting information from said local telephone terminal to said remote telephone terminal in response to said script; and (d) means for displaying said information at said remote telephone terminal.

BRIEF DESCRIPTION OF DRAWINGS

The invention will be further understood from the following description with references to the drawings in which.

DETAILED DESCRIPTION OF THE PREFERRED EMBODIMENTS

Figure 1:
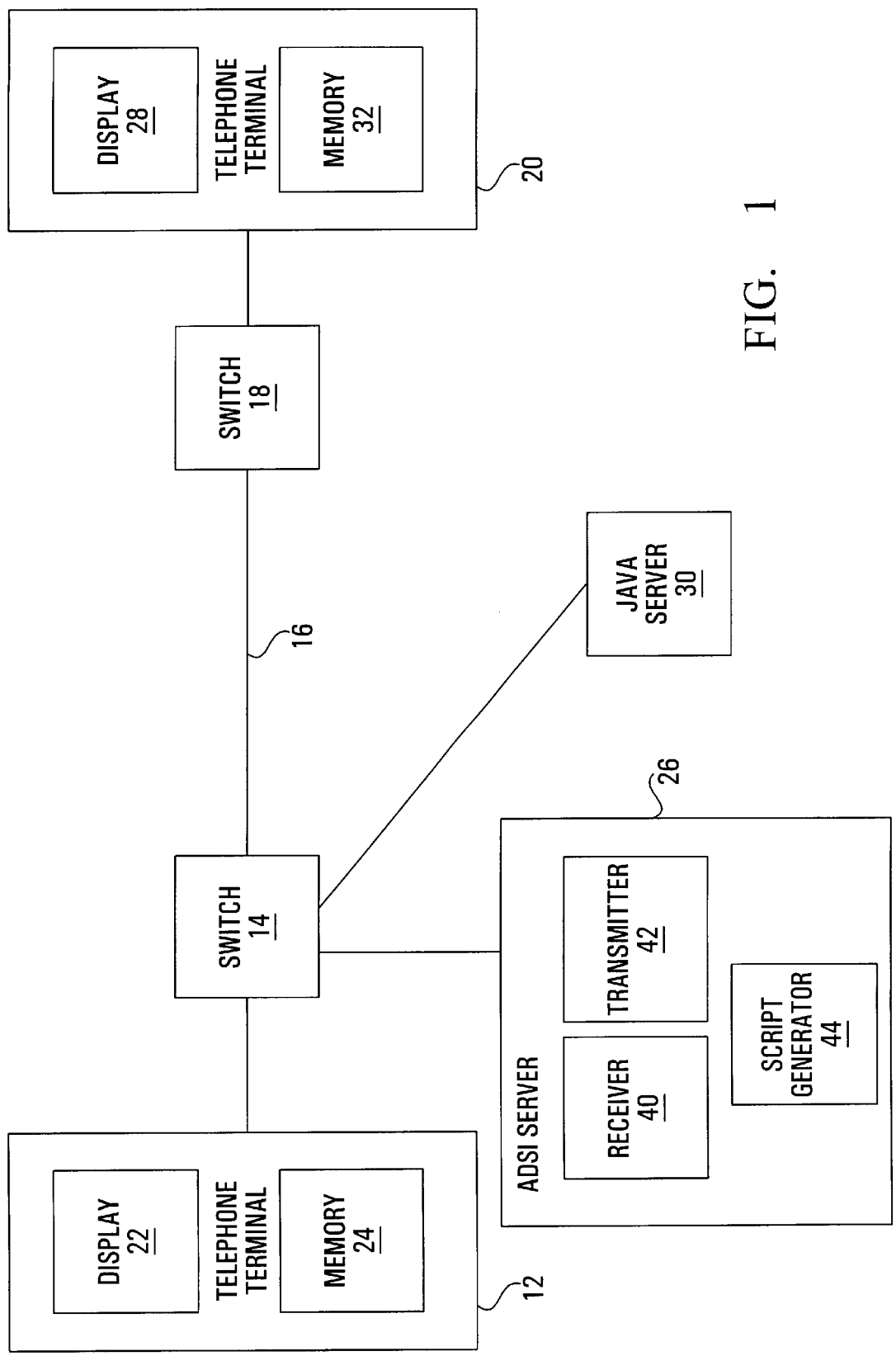
FIG. 1 is a schematic view of a communication system in accordance with an embodiment of the present invention.

FIG. 1 shows a schematic view of a communication system 10 illustrating the preferred embodiment of the present invention. Local telephone terminal 12 is connected to a telephone switch 14. Telephone switch 14 may be an end-office or PBX or KSU-less PBX or any other telephone switch known to those skilled in the art. Telephone switch 14 is connected by a communication line 16 to a distant telephone switch 18. Distant telephone switch 18 is connected to remote telephone terminal 20. As will be apparent to those skilled in the art, communication line 16 could comprise a series of links and switches. As will also be apparent to those skilled in the art, remote telephone terminal 20 could be connected to telephone switch 14, without any intervening network elements such as communication line 16 or distant telephone switch 18.

Local telephone terminal 12 has a local display 22. Local display 22 may be used to display information, such as name-and-number directories. This information is stored in local memory 24.

Telephone switch 14 has associated with it a network element such as ADSI (Analog Display Services Interface) server 26. ADSI server 26 has a transmitter 40, receiver 42, and script generator 44. The script generator generetes scripts that are programs and data allowing various types of information to be displayed on telephone terminal displays, such as local display 22.

In a preferred embodiment, there is provided a method for accessing information in local memory 24 and displaying it on a remote display 28 associated with remote telephone terminal 20. The method comprises the following steps:

Step 1

A telephone user using remote terminal 20 indicates that data from local memory 24 is required. Remote telephone terminal 20 sends a message to distant telephone switch 18. The message is conveyed to telephone switch 14 and then to ADSI server 26. ADSI server 26 then sends an ADSI script to local telephone terminal 12. The ADSI script contains information about how information stored in local memory 24 should be extracted and transmitted to remote terminal 20.

Instead of an ADSI script, an ADSI-readable message could be used.

Step 2

Local telephone terminal 12 receives the ADSI script. Information is retrieved from local memory 24 and transmitted to remote telephone terminal 20, by way of a DTMF coded message, an embedded modem or a proprietary message protocol.

Step 3

The information is displayed on remote display 28, or stored in remote memory 32 for later display or use by remote telephone terminal 20.

Preferably the method will involve an additional step of sending a query back to remote telephone terminal 20 requesting password information. The process then proceeds as above if remote telephone terminal 20 sends correct password information to ADSI server 26 in response to the query.

Preferably, the ADSI script sent from ADSI server 26 to local telephone terminal 12 contains an instruction that no ringing tone be generated.

As an alternative to the preferred embodiment, the message from remote telephone terminal 20 is not sent to ADSI server 26 but to a different type of network element, namely JAVA server 30. JAVA server 30 then sends a JAVA readable message to local telephone terminal 12 and the method proceeds as above. The JAVA-readable message could also be a JAVA-Script script, or JAVA-class(es).

As a further alternative, remote telephone terminal 20 contains a ADSI or JAVA script that is transmitted directly to local telephone terminal 12.

Numerous modifications, variations and adaptations may be made to the particular embodiments of the invention described above without departing from the scope of the invention which is defined in the claims.

What is claimed is:

1. For a communications network, a method for displaying on a remote telephone terminal information stored at a local telephone terminal comprising the steps of:
   (a) generating a request for information at a remote telephone terminal;
   (b) transmitting said request to a network element;
   (c) transmitting a script from said network element to a local telephone terminal in response to said request;
   (d) transmitting information from said local telephone terminal to said remote telephone terminal in response to said script; and
   (e) displaying said information at said remote telephone terminal.

2. The method claimed in claim 1 further comprising the steps of:
   responding to said request with a password query to said remote telephone terminal; and
   proceeding if response to said password query is correct.

3. The method claimed in claim 1 wherein said script contains an instruction to prevent said local telephone terminal from ringing.

4. The method claimed in claim 1 wherein said script is an ADSI script.

5. The method claimed in claim 1 wherein said script is a JAVA script.

6. The method claimed in claim 1 wherein said script is a JAVA-readable message.

7. The method claimed in claim 1 wherein said script is at least one JAVA class.

8. The method claimed in claim 1 wherein said script is an ADSI-readable message.

9. The method of claim 1 further comprising the step of storing said information at said remote telephone terminal prior to said displaying.

10. A method for displaying on a remote telephone terminal information stored at a local telephone terminal comprising the steps:
    (a) generating a request for information to be displayed at a remote telephone terminal, said request including a script;
    (b) transmitting said request to a local telephone terminal;
    (c) transmitting information from said local telephone terminal to said remote telephone terminal in response to said script; and
    (d) displaying said information at said remote telephone terminal.

11. The method claimed in claim 10 further comprising the steps:
    responding to said request with a password query to said remote telephone terminal; and
    proceeding if response to said password query is correct.

12. The method claimed in claim 10 wherein said script contains an instruction to prevent said local telephone terminal from ringing.

13. The method of claim 10 further comprising the step of storing said information at said remote telephone terminal prior to said displaying.

14. A network element adapted to receive queries for information from a remote telephone terminal comprising:
    (a) a receiver for receiving a query from said remote telephone terminal at said network element;
    (b) a script generator for composing a request for information from a local memory of a local telephone terminal based on said query; and,
    (c) a transmitter, for transmitting said request to said local telephone terminal,
    said request causing selected content of said local memory to be transmitted from said local telephone terminal for said remote telephone terminal.

15. A communications system for displaying on a remote telephone terminal information stored at a local telephone terminal comprising:
    (a) means for generating a request for information at a remote telephone terminal;
    (b) means for transmitting said request to a network element;
    (c) means for transmitting a script from said nework element to a local telephone terminal in response to said request;
    (d) means for transmitting information from said local telephone terminal to said remote telephone terminal in response to said script; and
    (e) means for displaying said information at said remote telephone terminal.

16. A communications system for displaying on a remote telephone terminal information stored at a local telephone terminal comprising:

(a) means for generating a request for information to be displaced at a remote telephone terminal, said request including a script;

(b) means for transmitting said request to a local telephone terminal;

(c) means for transmitting information from said local telephone terminal to said remote telephone terminal in response to said script; and (d) means for displaying said information at said remote telephone terminal.

* * * * *